Feb. 24, 1970  G. LAING  3,497,252
LATCH RELEASE ARRANGEMENT FOR VEHICLE BODIES
Filed July 30, 1968  2 Sheets-Sheet 1

INVENTOR.
Glenn Laing
BY
Herbert Furman
ATTORNEY

INVENTOR.
Glenn Laing
BY
Herbert Furman
ATTORNEY

United States Patent Office 3,497,252
Patented Feb. 24, 1970

3,497,252
LATCH RELEASE ARRANGEMENT FOR VEHICLE BODIES
Glenn Laing, Warren, Mich., assignor to General Motors Corporation, Detroit, Mich., a corporation of Delaware
Filed July 30, 1968, Ser. No. 748,799
Int. Cl. E05b 3/00, 5/00
U.S. Cl. 292—336.3          3 Claims

ABSTRACT OF THE DISCLOSURE

A latch release arrangement includes a generally U-shaped frame having a base plate for securing the frame and the plate to an inner panel of a door. A bellcrank lever is pivoted between the walls of the frame and is secured to the remote handle. A transfer lever is pivoted to the base plate and a rod link connects the bellcrank and the transfer lever. A torsion spring biases the transfer lever in a direction to hold the bellcrank in engagement with a fixed stop extending between the spaced walls of the frame. Both the bellcrank and the transfer lever have bifurcated spaced legs and one end of the rod link fits within an aperture in one leg and the other leg overlies an adjacent portion of the rod link to prevent disengagement. The transfer lever is connected to the detent of the door lock. A shaft is rotatably mounted between the base plate and the base wall of the frame and a lever is fixed to this shaft. A tension spring interconnects the shaft lever and the bellcrank to locate the shaft lever in a neutral position and resist movement to any other position. The shaft lever is connected to the locking lever of the lock and the shaft mounts a manually operable knob. The tension spring has its line of force in a plane coaxial with the axis of the shaft so that movement of the bellcrank does not move the shaft lever or shaft.

---

This invention relates to a latch release arrangement for vehicles bodies and more particularly to a combined inside remote handle and lock operator unit for vehicle body door locks.

Conventionally, vehicle bodies include a swingable remote handle operably connected to the detent of the door lock for releasing the dentent if the lock is in unlocked condition. The lock is placed in locked or unlocked condition by an inside lock operator, such as a garnish button, or by an outside lock operator, such as a key cylinder, both of which are operably connected to the locking lever of the lock.

In certain body styles, it is desirable to have the remote handle and the inside lock operator adjacent each other for easy manipulation and to also combine the remote handle and the operator as a unit. This invention accomplishes this purpose and, in its preferred embodiment, provides a compact unit including both a swingable remote handle and a rotatable lock operator. The remote handle moves laterally of the inner panel of the door, or inwardly of the body, and is connected to the detent of the door lock by swingable intermediate transfer lever and shiftable links. A torsion spring normally biases the swingable lever to its nonoperating position to in turn locate the remote handle in its nonoperating position in engagement with a fixed stop. The lock operator is rotatably mounted adjacent the remote handle for movement between locked and unlocked positions and is normally located in a neutral position intermediate its locked and unlocked positions by a spring interconnecting the operator and the remote handle. The action of this spring is generally coplanar with the axis of rotation of the lock operator so that movement of the remote handle has no effect on movement of the lock operator. Thus a compact unit is provided which can be preassembled and mounted on the inner panel of the door without individual adjustment of the handle and lock operator.

The primary object of this invention is to provide a combined inside remote handle and lock operator unit for vehicle body door locks which includes a swingable remote handle and a rotatable lock operator which can be preassembled and mounted on the body without further individual adjustment. Another object of this invention is to provide such a unit which includes resilient means locating the handle in its nonoperating position and other resilient means interconnecting the handle and the lock operator to normally maintain the lock operator in a neutral position and permit movement of either independently of the other.

These and other objects of this invention will be readily apparent from the following specification and drawings wherein.

Figure 1:
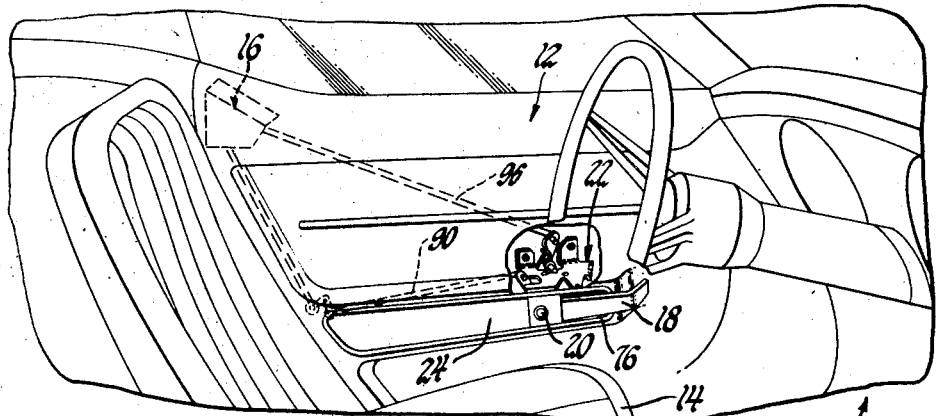
FIGURE 1 is a partial perspective view of the interior of a vehicle body embodying a remote handle and lock operator unit according to this invention.

Referring now particularly to FIGURE 1 of the drawings, a vehicle body designated generally 10 includes a front door 12 on the driver's side of the body which is movable between a closed position as shown and an open position, not shown, to provide access to the driver's seat 14 which is conventionally mounted in the interior of the body. The door 12 is held in closed position by a door lock designated generally 16 which is shown and described in Fox et al. 3,190,682, issued June 22, 1965 and assigned to the assignee of this invention.

The detent of lock 16 may be released from the exterior of the body by suitable manually operable means, such as a conventional manual pushbutton assembly, not shown, if the locking lever of the lock is in unlocked position. The detent of lock 16 likewise may be released from the inside of the body by a remote handle 18, if the lock is in unlocked condition. A lock operator 20 is provided adjacent the remote handle 18 to place the lock 16 in locked condition, if so desired, so that the lock may not be released from either the interior of the body or the exterior thereof.

The remote handle 18 and the lock operator 20 are part of a combined remote handle and lock operator unit designated 22 according to this invention. The unit 22 is mounted on the inner panel of door 12 and located within a built-up type arm rest 24 which forms part of the inner panel trim.

Figure 2:
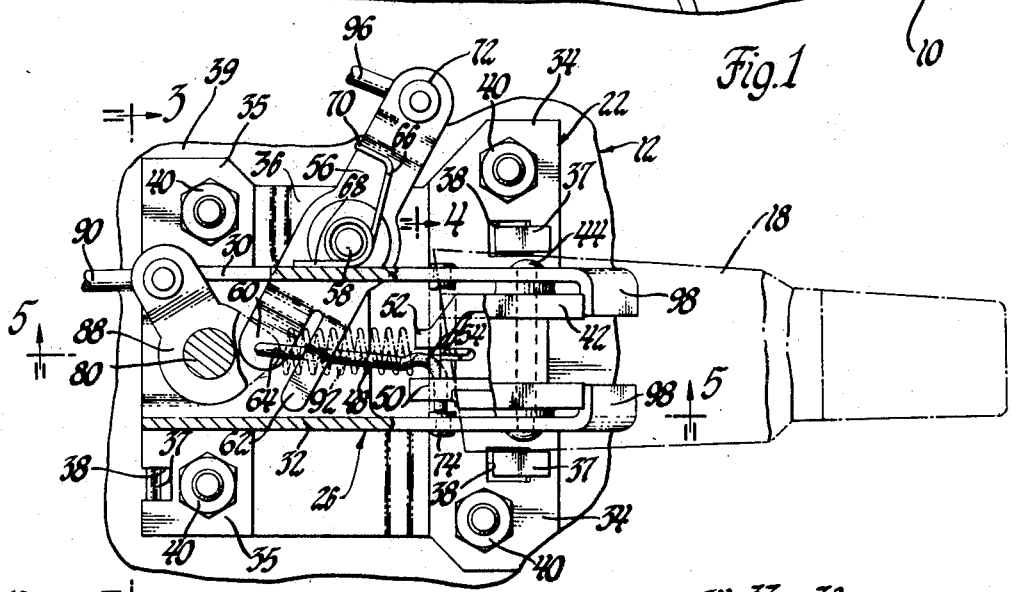
FIGURE 2 is an enlarged view of a portion of FIGURE 1.
Figure 3:
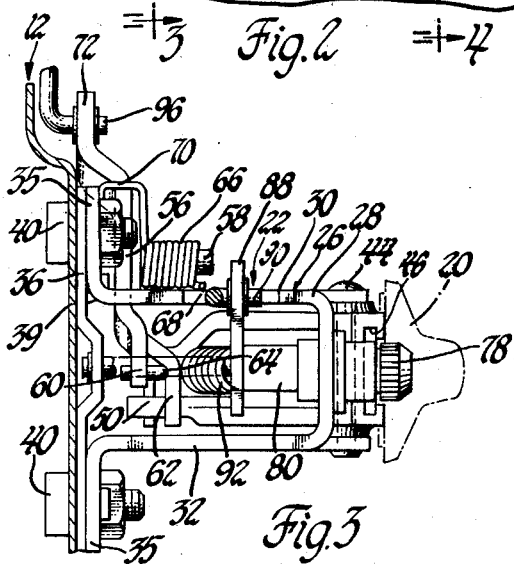
FIGURE 3 is a sectional view taken generally along the plane indicated by line 3—3 of FIGURE 2.
Figure 4:
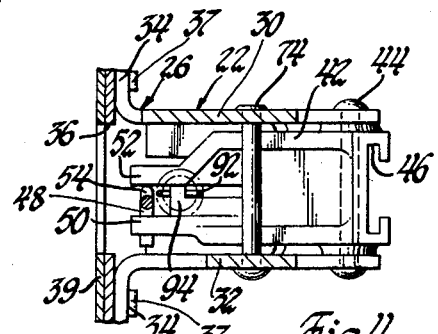
FIGURE 4 is a sectional view taken generally along the plane indicated by line 4—4 of FIGURE 2.

Referring now to FIGURES 2 through 8, the unit 22 includes a U-shaped frame or support 26 having a side or base wall 28, an upper wall 30, a lower wall 32 and right- and left-hand offset pairs of flanges 34 and 35 which extend laterally from the upper and lower walls and seat against an offset mounting plate 36. Plate 36 has tabs 37 which interfit with openings 38 of support 26 to provide a support assembly. The plate 36 seats on offsets in the inner panel 39 of the door 12, as shown in FIGURE 3, and both his plate and the flanges 34 and 35 are bolted at 40 to the inner panel of the door to mount the support 26 hereon.

A bellcrank lever 42 is pinned at 44 to the walls 30 and 32 of the support 26. One leg of the lever includes a dovetail channel 46 which receives a generally T-shaped portion at one end of the remote lever 18 to secure the remote lever to the lever 42. A rod link 48 has one bent end hooked within an apertured extension 50 of the other leg of the lever 42. A hook-shaped extension 52 overlies the extension 50 and an arcuate offset 54 of the rod link to maintain the one bent end of the link 48 within the aperture of the extension 50. The link is assembled to extension 50 by locating the bent end within the bight of extension 52 and within the aperture of extension 50 and then rotating the link to locate the offset 54 underneath extension 52. A transfer lever 56 is pivoted at 58 to the plate 36. The other bent end of the link 48 is hooked within an aperture in one offset leg 60 of the lever 56 and a second offset leg 62 of the lever overlies and engages the link 48 to one side of an arcuate offset 64 therein to thereby maintain the other bent end of the link connected to the leg 60. The link 48 is assembled to lever 56 by hooking the other bent end to leg 60 and then rotating the link or lever to locate the link underneath leg of the lever 42. A hook-shaped extension 52 overlies to the member to which it is connected so that there can be no disengagement between the link 48 and either lever 42 or 56.

Figure 8:
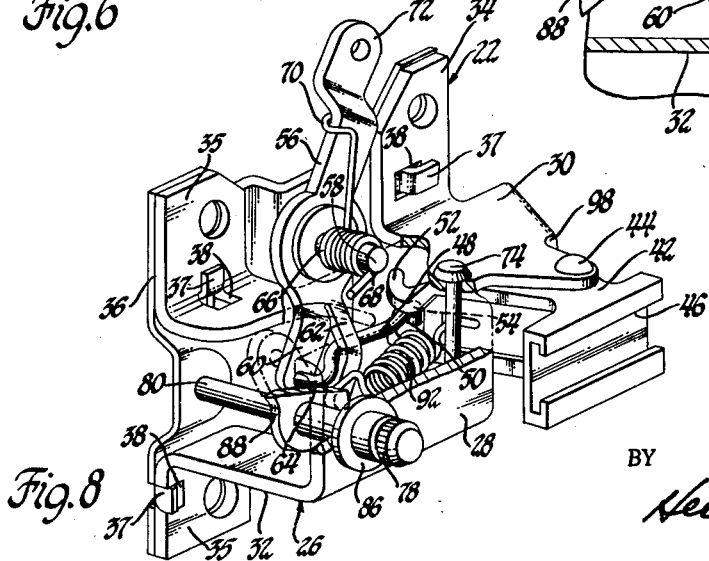
FIGURE 8 is a partially broken away perspective view.

A coil torsion spring 66 surrounds the pivot 58 and has one end 68 thereof bearing against the wall 30 and the other end 70 thereof hooked to the lever 56 adjacent the upper offset leg 72 thereof to continually bias the lever 56 clockwise as viewed in FIGURES 2 and 8. The action of the spring 66 in turn shifts the rod link 48 rearwardly of the body to bias the lever 42 counterclockwise as viewed in FIGURE 8 or clockwise as viewed in FIGURE 5 and maintain the lever 42 in engagement with a stop pin 74 extending between the walls 30 and 32. Thus, the remote handle 18 is normally maintained in its nonoperating position shown in FIGURES 1 and 5 wherein it sits within a slot or opening 76 in the base or inner wall of the arm rest 24.

The operator 20 is a manual knob which can be grasped by the operator's fingers. The knob includes a splined hub which receives the splined outer end 78 of a shaft 80 and is conventionally secured to the shaft by means of an omega clip, not shown. The shaft 80 is journaled in the base wall 28 of support 26 and also in the plate 36. An escutcheon 82, FIGURES 5 and 6, fits within a counterbored opening 84 provided in the inner wall of the arm rest 24, with the escutcheon being retained between the operator 20 and a flange 86 of the shaft 80.

A lever 88 is secured to the shaft 80 for rotation therewith relative to a cutout in wall 30. A rod 90 connects the lever 88 with the locking lever, not shown, of the lock 16 and a coil tension spring 92 is hooked between the lever 88 and a rib 94 extending between extensions 50 and 52 of lever 42. It will be noted, FIGURE 2, that the action of the spring 92 is generally coplanar with the axis of rotation of the shaft 80 so that the spring 92 normally maintains the lever 88 in the position shown and resists movement thereof either clockwise or counterclockwise of the position shown. Movement of the lever 88 in either direction upon operation of the operator 20 places the locking lever of the lock in either locked or unlocked condition. The spring 92 is weaker than the spring 66 but aids this spring in holding lever 42 against the stop pin 74.

When the remote handle is operated, the spring 92 will, of course, be tensed. However, since the action of the spring is generally coplanar with the axis of the shaft 80, the remote handle may be operated as desired without in any manner rotating the shaft 80 as can be seen from a comparison of FIGURES 5 and 6.

Figure 5:
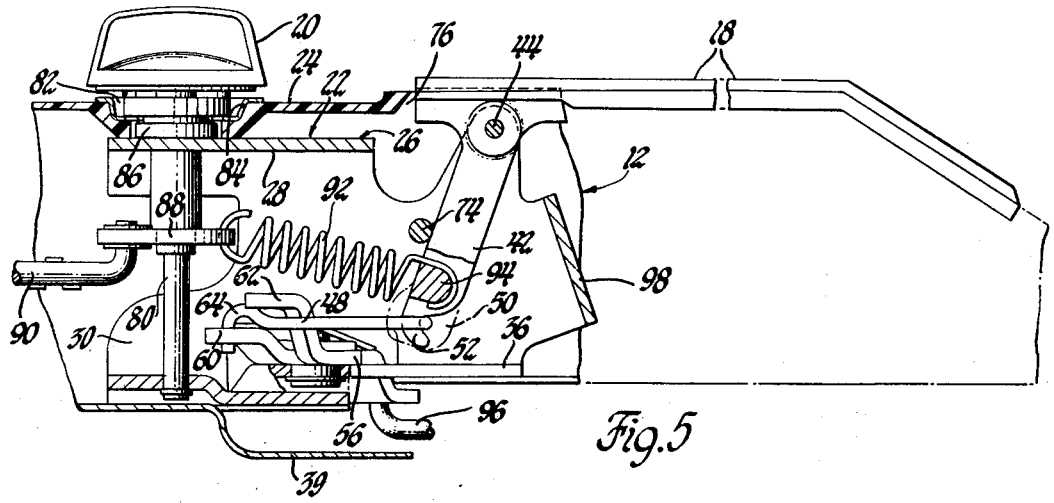
FIGURE 5 is a view taken generally along the plane indicated by line 5—5 of FIGURE 2.
Figure 6:
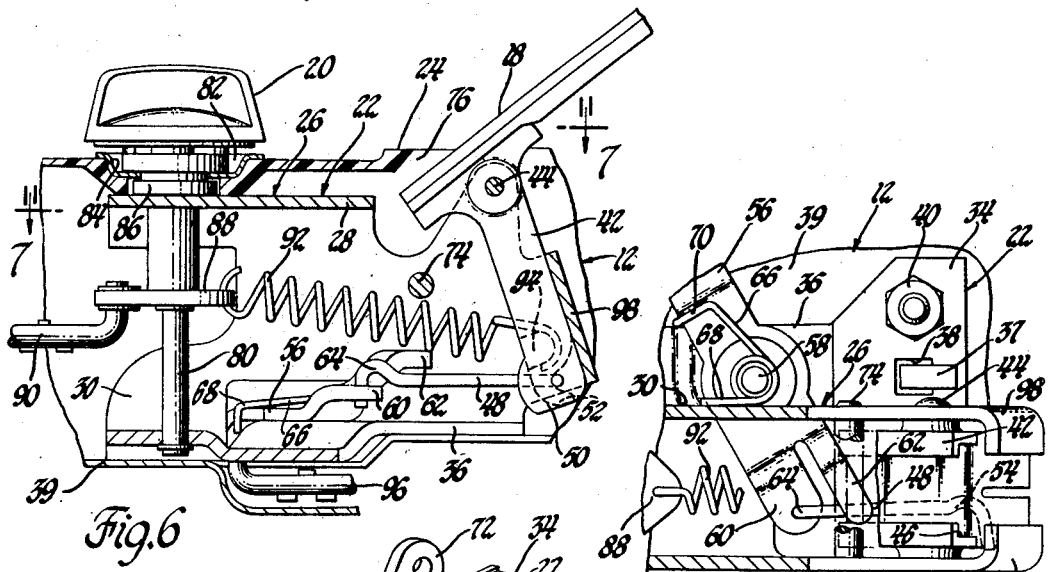
FIGURE 6 is a view similar to FIGURE 5 showing the remote handle in its operating position.
Figure 7:
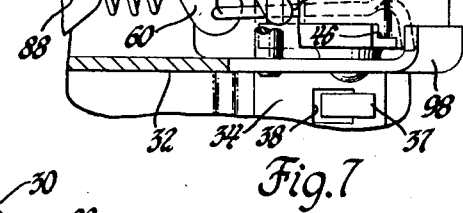
FIGURE 7 is a partial view taken generally along the plane indicated by line 7—7 of FIGURE 6.

When the remote handle 18 is rotated from its position of FIGURE 5 to its position of FIGURE 6 by the operator, the lever 56 is rotated counterclockwise as viewed in FIGURES 2 and 8. As best shown in FIGURES 5 and 6, the inner panel 39 of the door is offset to permit swinging movement of the offset upper end 72 of the lever 56 and also shifting movement of a rod 96 which connects the lever 56 to the detent of the door lock 16.

Movement of the remote handle from its position of FIGURE 5 to its position of FIGURE 6 is limited by engagement of lever 42 with a pair of lateral flanges 98 of the walls 30 and 32 of the support 26.

From the foregoing, it can be seen that a compact unit is provided which includes both the remote handle and the lock operator. By combining both in a single compact unit, they can be located adjacent each other and additionally can be preassembled before installation on the body. Further, by resiliently locating the remote handle 18 in its normal position in engagement with a fixed stop and by resiliently locating the lock operator in its neutral position by resilient means having a line of force coaxial with that of the operator, the unit can be made with a minimum number of parts and yet permit movement of the lock operator and the remote handle independently of each other.

Thus this invention provides an improved latch release arrangement for vehicle bodies.

What is claimed is:

1. A latch release arrangement for vehicle bodies comprising, in combination, a support assembly, a first lever pivotally mounted on the assembly for swinging movement relative thereto, a transfer lever swingably mounted on the support assembly for movement transversely of the first lever, link means interconnecting the first lever and the transfer lever, means locating the first lever and the transfer lever in nonoperating positions, a rotatable shaft mounted on the support assembly, a lever secured to the shaft for rotation therewith, and resilient means interconnecting the shaft lever and the first lever and exerting a line of force generally coplanar with the axis of the shaft to normally maintain the shaft lever in nonoperating position and permit movement of the first lever independently of movement of the shaft lever.

2. A latch release arrangement for vehicle bodies comprising, in combination, a support assembly, a first lever pivotally mounted on the assembly for swinging movement relative thereto, a transfer lever swingably mounted on the support assembly for movement transversely of the first lever, stop means on the assembly locating the first lever in nonoperating position, link means interconnecting the first lever and the transfer lever, resilient means biasing the transfer lever in a direction to hold the first lever in engagement with the stop means and thereby locate the transfer lever in nonoperating position, a rotatable shaft mounted on the support assembly, a lever secured to the shaft for rotation therewith, and resilient means interconnecting the shaft lever and the first lever and exerting a line of force generally coplanar with the axis of the shaft to normally maintain the shaft lever in nonoperating position and permit movement of the first lever independently of movement of the shaft lever.

3. A latch release arrangement for vehicle bodies comprising, in combination, a support assembly including a pair of spaced walls, a first lever pivotally mounted between the walls for swinging movement relative thereto, a transfer lever swingably mounted on a wall of the support assembly transverse of the spaced walls for movement transversely of the first lever, link means interconnecting the first lever and the transfer lever, fixed stop means on the spaced walls engageable by the first lever to locate the first lever in nonoperating position, resilient means biasing the transfer lever about the pivot thereof in a direction to hold the first lever in engagement with the stop means and thereby locate the transfer lever in nonoperating positions, a rotatable shaft mounted on the support, assembly, a lever secured to the shaft for rotation therewith, and second resilient means interconnecting the shaft lever and the first lever and additionally biasing the first lever into engagement with the stop means, the second resilient means exerting a line of force generally coplanar with the axis of the shaft to normally maintain the shaft lever in nonoperating position and permit movement of the first lever independently of movement of the shaft lever.

References Cited

UNITED STATES PATENTS

| | | | |
|---|---|---|---|
| 2,835,526 | 5/1958 | Van Voorhees | 292—216 |
| 2,960,362 | 11/1960 | Garvey | 292—280 |
| 3,069,889 | 12/1962 | Johnstone | 292—167 X |

FOREIGN PATENTS

| | | |
|---|---|---|
| 1,237,504 | 4/1960 | France. |

MARVIN A. CHAMPION, Primary Examiner

EDWARD J. McCARTHY, Assistant Examiner

PO-1050
(5/69)

UNITED STATES PATENT OFFICE
CERTIFICATE OF CORRECTION

Patent No. 3,497,252      Dated February 24, 1970

Inventor(s) Glenn Laing

It is certified that error appears in the above-identified patent and that said Letters Patent are hereby corrected as shown below:

Column 1, line 44, "dentent" should read -- detent --.
Column 3, line 29, delete "of the lever 42. A hook-shaped extension 52 overlies" and insert -- 62. Thus each end of the link 48 is effectively trapped --. Column 5, line 4, after "support" delete the comma ",".

SIGNED AND
SEALED
AUG 11 1970

(SEAL)
Attest:

Edward M. Fletcher, Jr.
Attesting Officer

WILLIAM E. SCHUYLER, JR.
Commissioner of Patents